United States Patent
Melanson et al.

(10) Patent No.: US 7,524,251 B2
(45) Date of Patent: Apr. 28, 2009

(54) GOLF PRODUCTS PRODUCED BY A STOICHIOMETRICALLY IMBALANCED RIM SYSTEM

(75) Inventors: David M. Melanson, Northampton, MA (US); Michael J. Tzivanis, Chicopee, MA (US)

(73) Assignee: Callaway Golf Company, Carlsbad, CA (US)

(*) Notice: Subject to any disclaimer, the term of this patent is extended or adjusted under 35 U.S.C. 154(b) by 136 days.

(21) Appl. No.: 11/216,926

(22) Filed: Aug. 30, 2005

(65) Prior Publication Data
US 2007/0049420 A1 Mar. 1, 2007

(51) Int. Cl.
*A63B 37/00* (2006.01)
(52) U.S. Cl. ..................................... 473/351
(58) Field of Classification Search ................. 473/378, 473/351
See application file for complete search history.

(56) References Cited

U.S. PATENT DOCUMENTS

| | | |
|---|---|---|
| 2,741,480 A | 4/1956 | Smith |
| 2,973,800 A | 3/1961 | Muccino |
| 3,053,539 A | 9/1962 | Picchowski |
| 3,264,272 A | 8/1966 | Rees |
| 3,313,545 A | 4/1967 | Bartsch |
| 3,373,123 A | 3/1968 | Brice |
| 3,384,612 A | 5/1968 | Brandt et al. |
| 3,395,109 A | 7/1968 | Molitor et al. |
| 3,458,205 A | 7/1969 | Smith et al. |
| 3,502,338 A | 3/1970 | Cox |
| 3,534,965 A | 10/1970 | Harrison et al. |
| 3,572,721 A | 3/1971 | Harrison et al. |
| 3,883,145 A | 5/1975 | Cox et al. |
| 3,979,126 A | 9/1976 | Dusbiber |
| 3,989,568 A | 11/1976 | Isaac |
| 4,076,255 A | 2/1978 | Moore et al. |
| 4,085,937 A | 4/1978 | Schenk |
| 4,123,061 A | 10/1978 | Dusbiber |
| 4,190,711 A | 2/1980 | Zdrahala et al. |
| 4,218,543 A | 8/1980 | Weber et al. |
| 4,248,432 A | 2/1981 | Hewitt et al. |
| 4,272,079 A | 6/1981 | Nakade et al. |
| 4,274,637 A | 6/1981 | Molitor |
| 4,337,946 A | 7/1982 | Saito et al. |
| 4,431,193 A | 2/1984 | Nesbitt |
| 4,442,282 A | 4/1984 | Kolycheck |
| 4,570,937 A | 2/1986 | Yamada |
| 4,582,887 A | 4/1986 | Dominguez et al. |
| 4,590,219 A | 5/1986 | Nissen et al. |
| 4,607,090 A | 8/1986 | Dominguez |
| 4,650,193 A | 3/1987 | Molitor et al. |
| 4,674,751 A | 6/1987 | Molitor et al. |
| 4,679,795 A | 7/1987 | Melvin et al. |
| 4,688,801 A | 8/1987 | Reiter |
| 4,690,981 A | 9/1987 | Statz |
| 4,695,055 A | 9/1987 | Newcomb et al. |
| 4,714,253 A | 12/1987 | Nakahara et al. |
| 4,762,322 A | 8/1988 | Molitor et al. |

(Continued)

*Primary Examiner*—Raeann Trimiew
(74) *Attorney, Agent, or Firm*—Michael A. Catania; Elaine H. Lo

(57) ABSTRACT

Disclosed herein are golf products, such as golf balls and/or components thereof, including the product of a fast-chemical-reaction mixture comprising a polyol and an isocyanate. The component is formed by reaction injection molding the reaction mixture. In the reaction mixture, the stoichiometry of the reactants is imbalanced.

20 Claims, 3 Drawing Sheets

U.S. PATENT DOCUMENTS

| | | |
|---|---|---|
| 4,798,386 A | 1/1989 | Berard |
| 4,848,770 A | 7/1989 | Shama |
| 4,852,884 A | 8/1989 | Sullivan |
| 4,858,923 A | 8/1989 | Gobush et al. |
| 4,858,924 A | 8/1989 | Saito et al. |
| 4,878,674 A | 11/1989 | Newcomb et al. |
| 4,884,814 A | 12/1989 | Sullivan |
| 4,911,451 A | 3/1990 | Sullivan et al. |
| 4,919,434 A | 4/1990 | Saito |
| 4,957,297 A | 9/1990 | Newcomb et al. |
| 4,979,746 A | 12/1990 | Gentiluomo |
| 4,984,804 A | 1/1991 | Yamada et al. |
| 4,986,545 A | 1/1991 | Sullivan |
| 5,002,281 A | 3/1991 | Nakahara et al. |
| 5,006,297 A | 4/1991 | Brown et al. |
| 5,019,319 A | 5/1991 | Nakamura et al. |
| 5,026,067 A | 6/1991 | Gentiluomo |
| 5,035,425 A | 7/1991 | Edwards |
| 5,045,591 A | 9/1991 | Meyer et al. |
| 5,048,838 A | 9/1991 | Chikaraishi et al. |
| 5,068,151 A | 11/1991 | Nakamura |
| 5,072,944 A | 12/1991 | Nakahara et al. |
| 5,096,201 A | 3/1992 | Egashira et al. |
| 5,098,105 A | 3/1992 | Sullivan |
| 5,104,126 A | 4/1992 | Gentiluomo |
| 5,120,791 A | 6/1992 | Sullivan |
| 5,142,835 A | 9/1992 | Mrocca |
| 5,150,906 A | 9/1992 | Molitor et al. |
| 5,156,405 A | 10/1992 | Kitaoh et al. |
| 5,184,828 A | 2/1993 | Kim et al. |
| 5,187,013 A | 2/1993 | Sullivan |
| 5,197,740 A | 3/1993 | Pocklington et al. |
| 5,219,973 A | 6/1993 | Slack et al. |
| 5,222,739 A | 6/1993 | Horiuchi et al. |
| 5,244,969 A | 9/1993 | Yamada |
| 5,253,871 A | 10/1993 | Viollaz |
| 5,273,286 A | 12/1993 | Sun |
| 5,273,287 A | 12/1993 | Molitor et al. |
| 5,274,041 A | 12/1993 | Yamada |
| 5,281,651 A | 1/1994 | Arjunan et al. |
| 5,300,334 A | 4/1994 | Niederst et al. |
| 5,304,608 A | 4/1994 | Yabuki et al. |
| 5,306,760 A | 4/1994 | Sullivan |
| 5,312,857 A | 5/1994 | Sullivan |
| 5,314,187 A | 5/1994 | Proudfit |
| 5,324,783 A | 6/1994 | Sullivan |
| 5,330,837 A | 7/1994 | Sullivan |
| 5,334,673 A | 8/1994 | Wu |
| 5,338,610 A | 8/1994 | Sullivan |
| 5,368,304 A | 11/1994 | Sullivan et al. |
| 5,368,806 A | 11/1994 | Harasin et al. |
| 5,387,750 A | 2/1995 | Chiang |
| 5,403,010 A | 4/1995 | Yabuki et al. |
| 5,439,227 A | 8/1995 | Egashira et al. |
| 5,480,155 A | 1/1996 | Molitor et al. |
| 5,482,285 A | 1/1996 | Yabuki et al. |
| 5,484,870 A | 1/1996 | Wu |
| 5,490,673 A | 2/1996 | Hiraoka |
| 5,490,674 A | 2/1996 | Hamada et al. |
| 5,492,972 A | 2/1996 | Stefani |
| 5,553,852 A | 9/1996 | Higuchi et al. |
| 5,586,950 A | 12/1996 | Endo |
| 5,628,699 A | 5/1997 | Maruko et al. |
| 5,668,239 A | 9/1997 | Nodelman et al. |
| 5,674,137 A | 10/1997 | Maruko et al. |
| 5,688,191 A | 11/1997 | Cavallaro et al. |
| 5,692,974 A | 12/1997 | Wu et al. |
| 5,730,665 A | 3/1998 | Shimosaka et al. |
| 5,733,206 A | 3/1998 | Nesbitt et al. |
| 5,733,207 A | 3/1998 | Sullivan et al. |
| 5,733,428 A | 3/1998 | Calabria et al. |
| 5,739,247 A | 4/1998 | Lesko et al. |
| 5,739,253 A | 4/1998 | Nodelman et al. |
| 5,750,580 A | 5/1998 | Mayer et al. |
| 5,759,676 A | 6/1998 | Cavallaro et al. |
| 5,779,561 A | 7/1998 | Sullivan et al. |
| 5,779,562 A | 7/1998 | Melvin et al. |
| 5,779,563 A | 7/1998 | Yamagishi et al. |
| 5,783,293 A | 7/1998 | Lammi |
| 5,792,008 A | 8/1998 | Kakiuchi et al. |
| 5,797,808 A | 8/1998 | Hayashi et al. |
| 5,800,284 A | 9/1998 | Sullivan et al. |
| 5,803,831 A | 9/1998 | Sullivan et al. |
| 5,810,678 A | 9/1998 | Cavallaro et al. |
| 5,813,923 A | 9/1998 | Cavallaro et al. |
| 5,816,937 A | 10/1998 | Shimosaka et al. |
| 5,820,488 A | 10/1998 | Sullivan et al. |
| 5,820,489 A | 10/1998 | Sullivan et al. |
| 5,820,491 A | 10/1998 | Hatch et al. |
| 5,827,167 A | 10/1998 | Dougan et al. |
| 5,830,087 A | 11/1998 | Sullivan et al. |
| 5,833,553 A | 11/1998 | Sullivan et al. |
| 5,833,554 A | 11/1998 | Sullivan et al. |
| 5,836,833 A | 11/1998 | Shimosaka et al. |
| 5,849,168 A | 12/1998 | Lutz |
| 5,856,388 A | 1/1999 | Harris et al. |
| 5,863,264 A | 1/1999 | Yamagishi et al. |
| 5,873,796 A | 2/1999 | Cavallaro et al. |
| 5,885,172 A | 3/1999 | Hebert et al. |
| 5,888,437 A | 3/1999 | Calabria et al. |
| 5,891,973 A | 4/1999 | Sullivan et al. |
| 5,897,884 A | 4/1999 | Calabria et al. |
| 5,899,822 A | 5/1999 | Yamagishi et al. |
| 5,902,192 A | 5/1999 | Kashiwagi et al. |
| 5,908,358 A | 6/1999 | Wu |
| 5,919,100 A | 7/1999 | Boehm et al. |
| 5,919,862 A | 7/1999 | Rajagopalan et al. |
| 5,922,252 A | 7/1999 | Stanton et al. |
| 5,929,189 A | 7/1999 | Ichikawa et al. |
| 5,935,021 A | 8/1999 | Kashiwagi et al. |
| 5,947,842 A | 9/1999 | Cavallaro et al. |
| 5,947,843 A | 9/1999 | Calabria et al. |
| 5,959,059 A | 9/1999 | Vedula et al. |
| 5,976,035 A | 11/1999 | Umezawa et al. |
| 5,984,807 A | 11/1999 | Wai et al. |
| 6,290,614 B1 * | 9/2001 | Kennedy et al. ............ 473/378 |

* cited by examiner

GOLF PRODUCTS PRODUCED BY A STOICHIOMETRICALLY IMBALANCED RIM SYSTEM

CROSS REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to golf equipment comprising a fast-chemical-reaction-produced component. The component is made from a reaction injection molding process in which the stoichiometry between reactants is imbalanced.

2. Description of the Related Art

Reaction injection molding ("RIM") is a process used to make golf equipment or products such as golf balls and/or components thereof, including covers, cores, inner layers, etc. Highly reactive liquids are injected into a closed mold, mixed usually by impingement and/or mechanical mixing in an in-line device such as a "peanut mixer", and polymerized primarily in the mold to form a coherent, one-piece molded article. When used to make a polyurethane or polyurea article, RIM usually involves a rapid reaction between two types of reactants: (a) a polyol or other material with an active hydrogen, such as a polyfunctional alcohol or amine (hereinafter referred to as "polyol"); and (b) an isocyanate-containing compound (hereinafter referred to as "isocyanate"). The reactants are stored in separate tanks prior to molding and may be first mixed in a mix-head upstream of a mold and then injected into the mold. The liquid streams are metered in the desired weight to weight ratio and fed into an impingement mix-head, with mixing occurring under high pressure, e.g., 1500 to 3000 psi. The liquid streams impinge upon each other in the mixing chamber of the mix-head and the mixture is injected into the mold. One of the liquid streams typically contains a catalyst for the reaction. The reactants react rapidly after mixing to gel and form polyurethane or polyurea polymers. Such mixtures, typically reacting in five minutes or less, are herein referred to as "fast-chemical-reaction" mixtures.

RIM offers several advantages over conventional injection and compression molding techniques. For example, the reactants are simultaneously mixed and injected into the mold, forming the desired component. In conventional techniques, the reactants must first be mixed in a mixer separate from the molding apparatus, and then added into the apparatus. In such a process, the mixed reactants first solidify and must later be melted in order to properly mold the desired component.

Additionally, the RIM process requires lower temperatures and pressures during molding than injection or compression molding. Under the RIM process, the molding temperature is maintained from about 90 to about 180° F., and usually at about 100-160° F., in order to ensure proper injection viscosity. Compression molding is typically completed at a higher molding temperature of about 320° F. (160° C.). Injection molding is completed at an even higher temperature range of 392-482° F. (200-250° C.). Molding at a lower temperature is beneficial when, for example, the cover is molded over a very soft core so that the very soft core does not melt or decompose during the molding process.

Moreover, the RIM process creates more favorable durability properties in a golf ball component than conventional techniques. For example, a golf ball cover produced by a RIM process has a uniform or "seamless" cover in which the properties of the cover material in the region along the parting line are generally the same as the properties of the cover material at other locations on the cover, including at the poles. The improvement in durability is due to the fact that the reaction mixture is distributed uniformly into a closed mold. This uniform distribution of the injected materials reduces or eliminates knit-lines and other molding deficiencies which can be caused by temperature differences and/or reaction differences in the injected materials. The RIM process results in generally uniform molecular structure, density and stress distribution as compared to conventional injection molding processes, where failure along the parting line or seam of the mold can occur because the interfacial region is intrinsically different from the remainder of the cover layer and, thus, can be weaker or more stressed.

Furthermore, the RIM process is relatively faster than conventional techniques. In the RIM process, the chemical reaction usually takes place in under 5 minutes, typically in less than two minutes, sometimes in under one minute and, in many cases, in about 30 seconds or less. The demolding time may be 10 minutes or less. The molding process for the conventional methods itself typically takes about 15 minutes. Thus, the overall speed of the RIM process makes it advantageous over the injection and compression molding methods.

The term "demold time" generally refers to the mold release time, which is the time span from the mixing of the components until the earliest possible time at which the part may be removed from the mold. At that time of removal, the part is said to exhibit sufficient "green strength." The term "reaction time" generally refers to the setting time or curing time, which is the time span from the beginning of mixing until the time at which the product no longer flows. Further description of the terms setting time and mold release time are provided in the "Polyurethane Handbook," edited by Gunter Oertel, Second Edition, ISBN 1-56990-157-0, herein incorporated by reference.

Polyurethane and/or polyurea polymers are typically made from three reactants: alcohols, amines, and isocyanate-containing compounds. Both alcohols and amines have a reactive hydrogen atom and are generally referred to as "polyols". They react with the isocyanate-containing compound, which is generally referred to as an "isocyanate."

Several chemical reactions may occur during polymerization of isocyanate and polyol. Isocyanate groups (—N=C=O) that react with alcohols form a polyurethane, whereas isocyanate groups that react with an amine group form a polyurea. A polyurethane itself may react with an isocyanate to form an allophanate and a polyurea can react with an isocyanate to form a biuret. Because the biuret and allophanate reactions occur on an already-substituted nitrogen atom of the polyurethane or polyurea, these reactions increase cross-linking within the polymer. The stoichiometry of a polyurethane reaction is usually defined as the number of equivalents of active hydrogen groups divided by the number of equivalents of isocyanate groups multiplied by 100. In shorthand, the formula is [—OH or —NH2]/[—NCO]*100. Typical systems utilize a stoichiometry of 95 to 105. A stoichiometry of 95 represents a 5% excess of isocyanate, which ensures that all of the polyol, or soft component, is reacted, providing a fully cured material. A stoichiometry of 105 may be used to obtain a slightly softer material, with the excess polyol acting as a plasticizer. A stoichiometry of 95 to 105 shall be considered balanced. An imbalanced stoichiometry shall be considered to be less than 95 or greater than 105.

BRIEF SUMMARY OF THE INVENTION

Disclosed herein are various types of golf products or equipment, including golf balls and components thereof, and methods of making the same. The components are made by reaction injection molding (RIM). The components include the product of a fast-chemical-reaction mixture comprising an isocyanate and a polyol wherein the stoichiometry between the reactants is imbalanced. Excess isocyanate is provided in the RIM process system and the imbalance is measured by the stoichiometry, with lower stoichiometry corresponding to excess isocyanate. In embodiments, the stoichiometry of the reaction is from about 50 to about 90. In further embodiments, the stoichiometry of the reaction is from about 60 to about 90, and in more specific embodiments the stoichiometry of the reaction is from about 70 to about 85.

In one exemplary embodiment, a golf ball component, such as a cover, is provided. The golf ball cover includes the product of a fast-chemical-reaction mixture comprising an isocyanate and a polyol wherein the stoichiometry between the reactants is imbalanced. Additional golf ball components, such as a core or an intermediate layer produced by these materials and processes are also disclosed herein.

In another exemplary embodiment, the golf ball component has a Shore B hardness of 50 or more, including 75 or more. In one embodiment, the golf ball component has a Shore B hardness of from about 80 to about 95.

In an additional exemplary embodiment, the golf ball component is a golf ball cover having a Shore B hardness of 80 or more and exceptional shear resistance of 3.5 or less. The component may have a thickness of 0.0005 inches to 0.200 inches, In another embodiment, a method is provided for making a golf product through a RIM process wherein the stoichiometry between the reactants is imbalanced. A mixture comprising an isocyanate and a polyol is made, wherein the stoichiometry between the reactants is imbalanced. The mixture is then molded to form a golf product or component thereof.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
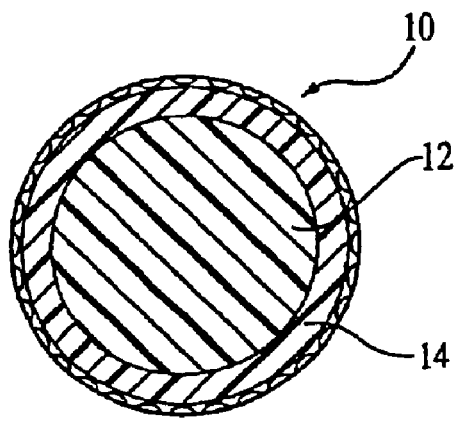
FIG. 1 shows a cross-sectional view of a golf ball having a golf ball cover formed according to the present disclosure.

Referring now to the drawings, FIG. 1 shows a golf ball having a cover comprising RIM polyurethane. The golf ball 10 includes a polybutadiene core 12 and a polyurethane cover 14 formed by RIM. The cover 14 is the product of a reaction mixture comprising an isocyanate and a polyol wherein the stoichiometry between the reactants is imbalanced.

Figure 2:
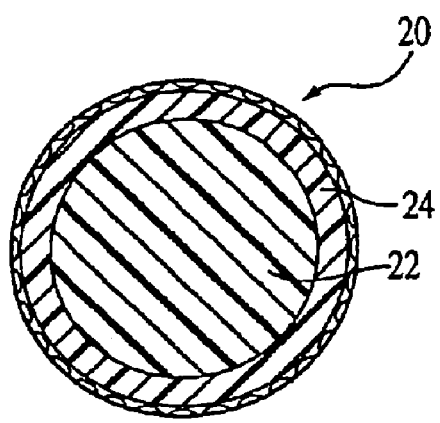
FIG. 2 shows a cross-sectional view of a golf ball having one or more golf ball components according to the present disclosure.

FIG. 2 shows a golf ball having a core comprising RIM polyurethane. The golf ball 20 has a RIM polyurethane core 22 and a RIM polyurethane cover 24. One or more of the components are formed from a reaction mixture comprising an isocyanate and a polyol wherein the stoichiometry between the reactants is imbalanced.

Figure 3:
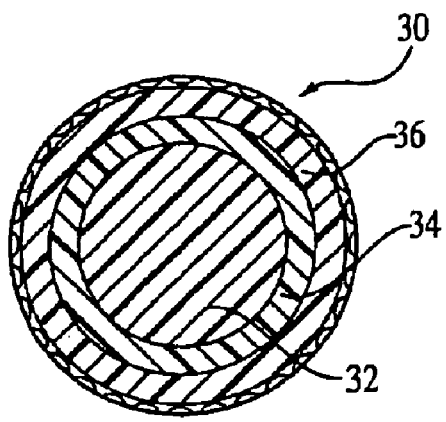
FIG. 3 shows another cross-sectional view of a golf ball having one or more golf ball components formed according to a reaction injection molding (RIM) process disclosed herein.

FIG. 3 shows a multi-layer golf ball 30 with a solid core 32 containing RIM polyurethane, a mantle or inner cover layer 34 comprising RIM polyurethane, and an outer cover layer 36. The outer cover layer 36 can also comprise RIM polyurethane. Alternatively, the inner cover layer 34 and/or the outer cover layer 36 can comprise ionomer or another conventional golf ball cover material. Such conventional golf ball cover materials typically contain titanium dioxide utilized to make the cover white in appearance.

The balls shown in FIG. 1 through FIG. 3 may be of a standard, enlarged or reduced size. Further, the core, intermediate and cover components may comprise any number of layers or sub-parts desired.

Figure 4:
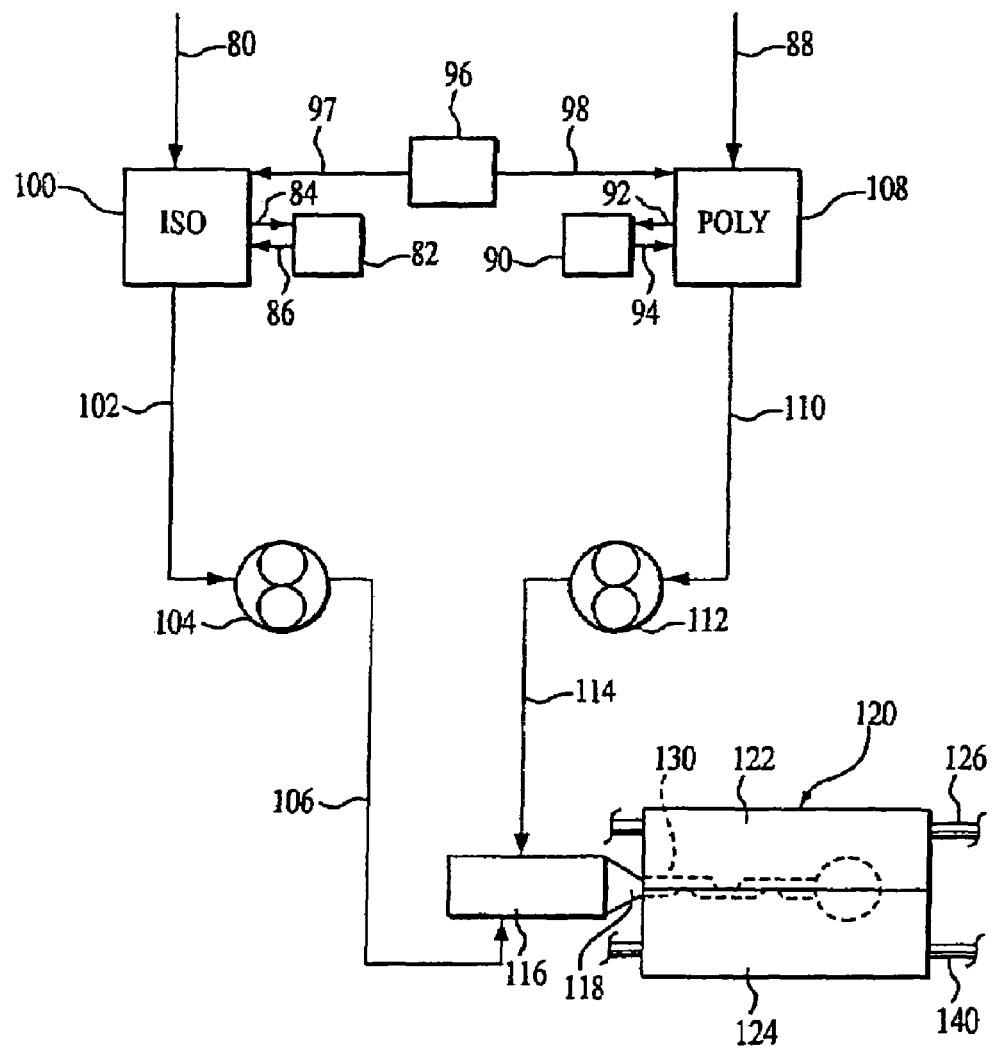
FIG. 4 is a process flow diagram which schematically depicts a reaction injection molding process according to the present disclosure.

FIG. 4 shows a process flow diagram for forming a RIM cover of polyurethane. Isocyanate from bulk storage is fed through line 80 to an isocyanate tank 100. The isocyanate is heated to the desired temperature, e.g. about 90 to about 150° F., by circulating it through heat exchanger 82 via lines 84 and 86. The isocyanate can be carried in a solvent. Examples of suitable solvents include methyl isobutyl ketone, methyl amyl ketone, butyl acetate and propylene glycol monomethyl ether acetate. The use of methyl isobutyl ketone as the solvent or part-solvent is advantageous because it tends to alleviate any potential moisture problems encountered with the acetate solvents.

The polyol is conveyed from bulk storage to a polyol tank 108 via line 88. The polyol component may also contains additives, such as stabilizers, surfactants, flow modifiers, catalysts, combustion modifiers, blowing agents, fillers, pigments, optical brighteners, and release agents to modify the physical characteristics of the product. The polyol is heated to the desired temperature, e.g. about 90 to about 150° F., by circulating it through heat exchanger 90 via lines 92 and 94. Dry nitrogen gas is fed from nitrogen tank 96 to isocyanate tank 100 via line 97 and to polyol tank 108 via line 98. Isocyanate is fed from isocyanate tank 100 via line 102 through a metering cylinder or metering pump 104 into recirculation mix head inlet line 106. Polyol is fed from polyol tank 108 via line 110 through a metering cylinder or metering pump 112 into a recirculation mix head inlet line 114. The recirculation mix head 116 receives isocyanate and polyol, mixes them, and provides for them to be fed through nozzle 118 into injection mold 120. The injection mold 120 has a top mold 122 and a bottom mold 124. Mold heating or cooling can be performed through lines 126 in the top mold 122 and lines 140 in the bottom mold 124. The materials are kept under controlled temperature conditions to insure that the desired reaction profile is maintained.

Inside the mix head 116, injector nozzles impinge the isocyanate and polyol at ultra-high velocity to provide excellent mixing. Additional mixing preferably is conducted using an aftermixer 130, which typically is constructed inside the mold between the mix head and the mold cavity. The reaction mixture viscosity should be sufficiently low to ensure that the empty space in the mold is completely filled. The reactant materials generally are preheated to from about 80 to about 200° F. before they are mixed. In most cases it is necessary to preheat the mold to, e.g., from about 100 to about 180° F., to ensure proper injection viscosity.

Figure 5:
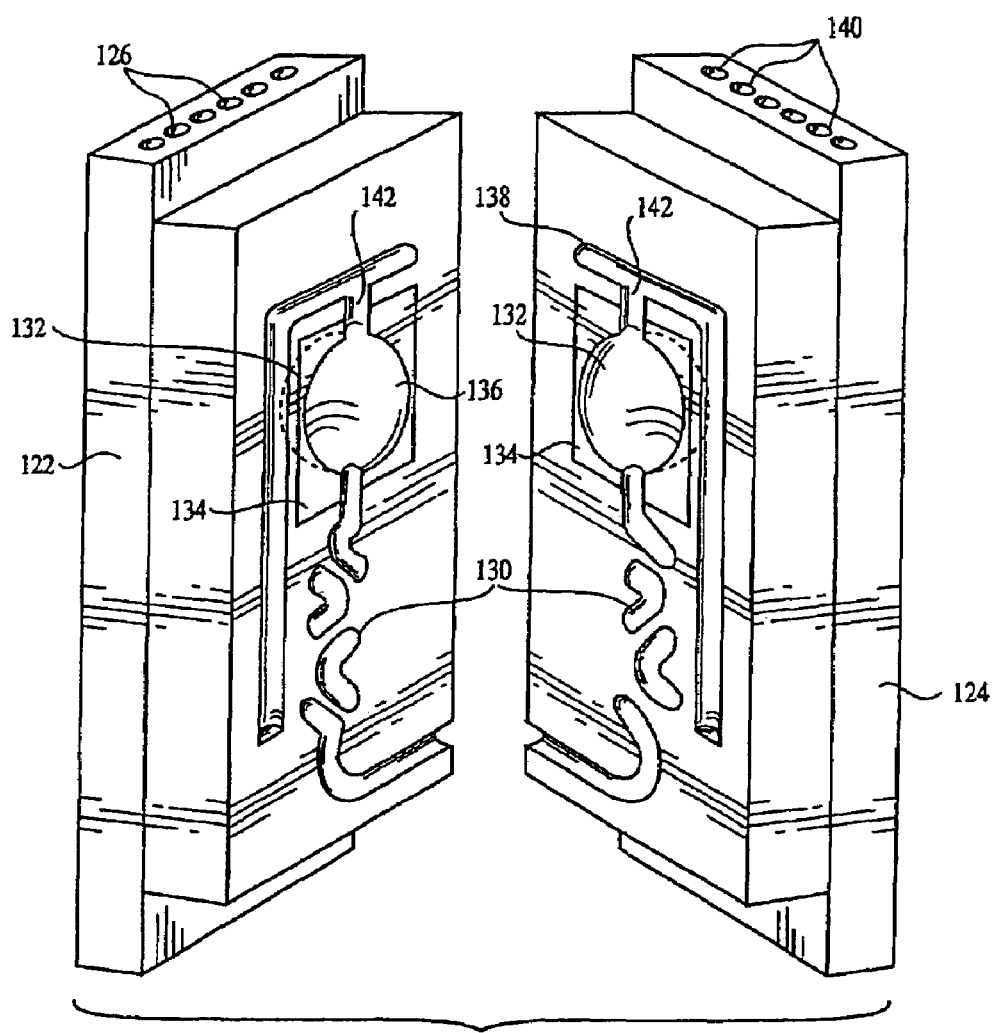
FIG. 5 shows a mold for reaction injection molding a golf ball cover as set forth herein.

FIG. 5 shows a mold used to make a golf ball cover. The mold includes a golf ball cavity chamber 134 in which a spherical golf ball cavity 132 with a dimpled, inner spherical surface 136 is defined. The aftermixer 130 can be a peanut aftermixer, as is shown in FIG. 5, or in some cases another suitable type, such as a heart, harp or dipper. However, the aftermixer does not have to be incorporated into the mold design. An overflow channel 138 receives overflow material from the golf ball cavity 132 through a shallow vent 142. Heating/cooling passages 126 and 140, which preferably are in a parallel flow arrangement, carry heat transfer fluids such as water, oil, etc. through the top mold 122 and the bottom mold 124. Alternatively, the heating/cooling passages may be present in the platens of the press in which the mold is installed. The mold cavity contains retractable pins and is generally constructed in the same manner as a mold cavity used to injection mold a thermoplastic golf ball cover. However, two differences when RIM is used are that tighter pin tolerances generally are required, and a lower injection pressure is used. Also, because of the lower injection pressure, the molds can be produced from lower strength material such as aluminum. Alternatively, the mold cavity may contain protrusions, or deep dimples, which support the insert during the injection process. This type of mold construction eliminates moving parts in the mold, facilitating processing, and improving centering.

In the process depicted in FIG. 4, excess isocyanate is provided and the stoichiometry of the reaction is from about 50 to about 90. In further embodiments, the stoichiometry of the reaction is from about 60 to about 90, and in more specific embodiments the stoichiometry of the reaction is from about 70 to about 85.

The variation in stoichiometry allows the use of one RIM machine to make golf balls with different cover hardnesses. Under normal circumstances, very low stoichiometries, defined here as stoichiometries less than 90, typically result in brittle physical properties: lower elongation, lower tear strength, and lower abrasion resistance. This may be due to excessive cross-linking. However, in a specific embodiment in this disclosure, a golf ball cover produced at low stoichiometry has produced a golf ball with higher hardness, and thus, reduced spin rates (favorable for increased distance) with no drop off in scuff or cut performance or other physical properties. Without being limited to any particular theory, it may be hypothesized that the absence of brittleness in the preferred embodiments may be due to the specific chemical or kinetic mechanisms in the preferred polyurethane/polyurea system (i.e. molecular chain length, polymerization kinetics, isocyanate content, etc.).

The reaction mixture comprises an isocyanate. The general structure of an isocyanate is R—(NCO)$_n$, where n is at least two, and R is an aromatic or an aliphatic group. The isocyanate may be also be a prepolymer. The prepolymer may be a blend of copolymers or a polymer. Furthermore, the prepolymer may comprise polyether, polyester, or polybutadiene components. Aromatic isocyanates which may be used in the present disclosure include, but are not limited to, toluene diisocyanate (TDI); diphenyl-methane-diisocyanate (MDI); naphthalene-1,5-diisocyanate (NDI); m- and p-phenylene diisocyanate; toluene-2,4- and -2,6-diisocyanate; diphenylmethane-4,4'-diisocyanate; chlorophenylene-2,4-diisocyanate; naphthalene-1,5-diisocyanate; 3-methyldiphenylmethane-4,4'-diisocyanate; 4,4'-diisocyanate-3,3'-dimethyldiphenylmethane; diphenyl ether diisocyanate; and 3-methyldiphenylmethane-4,4'-diisocyanate. Generally, aromatic isocyanates exhibit fast reaction times and good physical properties, but tend to have poor light fastness (i.e., discoloration due to UV light).

Aliphatic isocyanates which may be used in the present disclosure include, but are not limited to, hexamethylene diisocyanate (HDI); isophorone diisocyanate (IPDI); tetramethylene diisocyanate; octamethylene diisocyanate; decamethylene diisocyanate; dodecamethylene diisocyanate; tetradecamethylene diisocyanate; derivatives of lysine diisocyanate; tetramethylxylylene diisocyanate; trimethylhexane diisocyanate or tetramethylhexane diisocyanate; cycloaliphatic diisocyanates such as 1,4-, 1,3- or 1,2-diisocyanatocyclohexane; 4,4-di(isocyanatocyclohexyl)methane; 1-isocyanato-3,3,5-trimethyl-5-(isocyanatemethyl)-cyclohexane-(isophorone diisocyanate) or 2,4- or 2,6-diisocyanato-1-methylcyclohexane. Aliphatic isocyanates generally exhibit good light fastness and UV stability, but are slower to react and produce softer polymers than the aromatic isocyanates.

The reaction mixture also comprises a polyol, which can be selected from a polyalcohol, a polyamine, or a combination thereof. When the polyol is an alcohol, it is typically a polyfunctional alcohol, such as a diol, triol, etc., depending on the number of hydroxyl groups. Compounds containing the hydroxyl functional group can include polyesters, polyethers, and polybutadienes. Alternately, the hydroxyl functional polyol is ethylenically saturated. Some saturated polyethers include polymers of propylene oxide or propylene oxide/ethylene oxide; such materials are usually triols or diols. In specific embodiments, a polyether polyol or a polyester polyol is selected.

The alcohol may also be a glycol. Examples include, but are not limited to, polyethylene glycol; polypropylene glycol (PPG); polybutylene glycol; pentane glycol; hexane glycol; benzene glycol; xylene glycol; 2,3-dimethyl-2,3-butane diol; dipropylene glycol; and their polymers.

A polyamine may also be used in the reaction mixture. Examples include, but are not limited to, diethyltoluenediamine, tetramethyl-ethylenediamine; dimethylbenzylamine; diethylbenzylamine; pentamethyldiethylenetriamine; dimethyl cyclohexylamine; tetramethyl-1,3-butanediamine; pentamethyldipropylenetriamine; 1,2-dimethylimidazole; 2-methylimidazole; and bis-(dimethylaminoethyl)ether.

Other reactants containing a reactive hydrogen atom that would react with the isocyanate to form a polyurethane or polyurea polymer can be utilized. Such materials include polyamines, polyamides, short oil alkyds, castor oil, epoxy resins with secondary hydroxyl groups, phenolic resins, hydroxyl functional dendrimers, and hydroxyl functional vinyl resins. Suitable examples of such materials include ANCAMINE 2071, a modified polyamine marketed by Pacific Anchor Chemical Corporation, Los Angeles, Calif.; EPON V-40, a polyamide marketed by Shell Oil Company, Houston, Tex.; AROPLAZ 1133-X-69, a short oil alkyd by Reichhold Inc., Minneapolis, Minn.; EPON resin 828, an epoxy resin marketed by Shell Oil Company; PENTALYN 802A, a phenolic modified polyester resin marketed by Hercules Inc., Wilmington, Del.; and VAGH, a hydroxyl functional vinyl resin marketed by Union Carbide, Danbury, Conn. Non-limiting examples of other suitable RIM systems for use in, or in combination with, the present disclosure are VIBRARIM reaction injection moldable polyurethane and polyurea systems from Crompton Corporation (Middlebury, Conn.), BAYFLEX elastomeric polyurethane RIM systems, BAYDUR GS solid polyurethane RIM systems, PRISM solid polyurethane RIM systems, all from Bayer Corp. (Pittsburgh, Pa.), SPECTRIM reaction moldable polyurethane and polyurea systems from Dow Chemical USA (Midland, Mich.), including SPECTRIM MM 373-A (isocyanate) and 373-B (polyol), and ELASTOLIT SR systems from BASF (Parsippany, N.J.). The golf ball components of the present disclosure may also be optionally cross-linked by irradiation. Numerous ways are known to induce cross-linking in a polymer by free radical initiation, including peroxide initiation and UV irradiation. Other forms of particle irradiation, including electron beam, also can be used.

Gamma radiation allows golf balls to be irradiated in bulk. Gamma radiation penetrates relatively deep into the material undergoing irradiation, but also increases cross-linking of the inner core. Accordingly, the compression of the core can be adjusted to allow for the increase in hardness stemming from the cross-linking. Electron beam techniques are faster but cannot be used for treating in bulk as the electron beam does not sufficiently penetrate into the material and the product typically needs to be rotated to obtain an even or uniform cross-link density. The type of irradiation to be used will depend in part upon the underlying layers. For example, certain types of irradiation may degrade windings in a wound golf ball. On the other hand, balls with a solid core would not be subject to the same concerns. However, with any type of core, certain types of irradiation will tend to cross-link and thus harden the core. Depending upon whether this type of effect is sought or is to be avoided, the appropriate type of irradiation can be selected.

The level of radiation employed depends upon the desired end characteristics of the final golf ball component. However, generally a wide range of dosage levels may be used. For example, total dosages of up to about 12.5 or even 15 Mrads may be employed. Preferably, radiation delivery levels are controlled so that the golf ball component is not heated above about 80° C. (176° C.) while being cross-linked.

Golf ball components may have indicia and/or logos stamped or formed thereon. Such indicia can be applied by printing using a material or a source of energetic particles after the ball core and/or cover have been reaction-injection-molded according to the present invention. Printed indicia can be formed from materials known in the art, such as ink, foil (for use in foil transfer), etc. Indicia printed using a source of energetic particles or radiation can be applied by burning with a laser, burning with heat, directed electrons, or light, phototransformations of, e.g., U.V. ink, impingement by particles, impingement by electromagnetic radiation, etc. Furthermore, the indicia can be applied in the same manner as an in-mold coating, i.e., by applying the indicia to the surface of the mold prior to molding of the cover.

The resulting golf ball component comprises from about 5 to about 100 weight percent of polyurethane/polyurea based on the weight of the golf ball component. The product of the fast-chemical-reaction mixture may also comprise other agents. When the golf ball component is an outer cover layer, pigments or dyes, accelerators and UV stabilizers can be added. An example of a suitable white pigment is titanium dioxide. Examples of suitable UV light stabilizers are provided in commonly assigned U.S. Pat. No. 5,494,291, herein totally incorporated by reference. Furthermore, compatible polymeric materials can be added. For example, when the component comprises polyurethane and/or polyurea, such polymeric materials include polyurethane ionomers, polyamides, etc. Fillers can also be incorporated into the golf ball component, including those listed below.

Golf balls comprising a golf ball component according to the present disclosure are also contemplated. If the component is a cover layer, then a wide array of materials may be used for the cores and mantle layer(s) of the golf ball. For instance, the core and mantle or interior layer materials disclosed in U.S. Pat. Nos. 5,833,553, 5,830,087, 5,820,489 and 5,820,488, all of which are hereby incorporated by reference in their entirety, may be employed. If the component is a core or inner layer, then a variety of conventional materials may be used for one or more cover layers. For instance, the cover layer(s) may employ materials such as disclosed in U.S. Pat. Nos. 6,309,314, 6,277,921, 6,220,972, 6,150,470, 6,126,559, 6,117,025, 5,902,855, 5,895,105, 5,688,869, 5,591,803, and 5,542,677, all of which are hereby incorporated by reference in their entireties.

If the component is a golf ball cover, the golf ball may be a two-piece or multi-layer ball having a wound core, a solid, non-wound core, a liquid core, or a gel core.

One or more intermediate or cover layers can be included having different characteristics. It is particularly advantageous to have an outer cover Shore B hardness of 50 or more, including 70 or more. These measurements are made in general accordance with ASTM 2240, except they are made on the ball itself and not on a plaque. The outer layer is from about 0.005 to about 0.20 inches in thickness, including about 0.001 to about 0.100 inches in thickness. Thickness is defined as the average thickness of the non-dimpled cover of the outer cover. The outer cover is comprised of a relatively soft, low flex modulus (about 1000 psi or greater, including from about 2000 psi to about 50000 psi) material as noted above. The cover exhibits good durability characteristics (i.e., groove shear resistance of 3.5 or less, on a scale of 1 to 6 (lower numbers are better) corresponding to no loss or significant fraying of the cover material, and cut resistance of 3 or less on a scale of 1 to 5 (lower numbers are better) corresponding to a slight dent in the cover not discernible by touch). The groove shear resistance is measured on golf balls struck by a 56 degree wedge clubhead at about 103 feet per second. The cut resistance is measured on golf balls subjected to an off-center blow by a blade with an approximate 5/64" radius attached to a sled weighing approximately 6 lbs dropped from a height of about 42 inches.

The outer cover layer formed from the fast-chemical-reaction product of an isocyanate and a polyol wherein the stoichiometry between the reactants is imbalanced, when molded over the core (and inner cover or layer, or layers if a multi-layer cover) results in a golf ball having a coefficient of restitution ("COR") of at least 0.760, including at least 0.800. The COR of the ball will depend upon the properties of both the core and the cover and/or intermediate layer(s).

When utilizing an outer cover layer formed from the reaction product of an isocyanate and a polyol wherein the stoichiometry between the reactants is imbalanced, a conventional core component can be utilized. The core of the golf ball can be formed of a solid, or an encapsulated sphere filled with a gas, a liquid or a gel, or any other substance that will result in a core or an inner ball (core and a at least one inner cover layer, if the ball is a multi-layer ball), having the desired COR, compression and hardness and other physical properties.

The cores of the golf ball typically have a coefficient of restitution of about 0.750 or more, more preferably 0.770 or more, and a PGA compression of about 90 or less, and more preferably 70 or less. Furthermore, in some applications it may be desirable to provide a core with a coefficient of restitution of about 0.780 to about 0.790 or more. The core used in the golf ball is preferably a solid, but any core type known in the art may be used, such as wound, liquid, hollow, metal, and the like. The term "solid cores" as used herein refers not only to one piece cores but also to those cores having a separate solid layer beneath the covers and over the central core. The cores generally have a weight of about 25 to about 40 grams and preferably about 30 to about 40 grams. Larger and heavier cores, or lighter and smaller cores, may also be used when there is no desire to meet U.S.G.A. or R. & A. standards.

When the golf ball of the present disclosure has a solid core, this core can be compression molded from a slug of uncured or lightly cured elastomer composition comprising a high cis content polybutadiene and a metal salt of an α, β, ethylenically unsaturated carboxylic acid such as zinc mono- or diacrylate or methacrylate. To achieve higher coefficients of restitution and/or to increase hardness in the core, the manufacturer may include a small amount of a metal oxide such as zinc oxide. In addition, larger amounts of metal oxide than are needed to achieve the desired coefficient may be included in order to increase the core weight so that the finished ball more closely approaches the U.S.G.A. upper weight limit of 1.620 ounces.

Non-limiting examples of other materials that may be used in the core composition include, but are not limited to, compatible rubbers or ionomers, and low molecular weight fatty acids such as stearic acid. Free radical initiator catalysts such as peroxides may be admixed with the core composition so that on the application of heat and pressure, a curing or cross-linking reaction takes place. The core may also be formed from any other process for molding golf ball cores known in the art.

A thread wound core may comprise a liquid, solid, gel or multi-piece center. The thread wound core is typically obtained by winding a thread of natural or synthetic rubber, or thermoplastic or thermosetting elastomer such as polyurethane, polyester, polyamide, etc., on a solid, liquid, gel or gas filled center to form a thread rubber layer that is then covered with one or more mantle or cover layers. Additionally, prior to applying the cover layer(s), the thread wound core may be further treated or coated with an adhesive layer, protective layer, or any substance that may improve the integrity of the wound core during application of the cover layers and ultimately in usage as a golf ball.

The core, preferably a solid core, is about 1.2 to about 1.6 inches in diameter, although it may be possible to use cores in the range of about 1.0 to about 2.0 inches. If the ball has a single cover layer, the core size may be up to about 1.660 inches.

The present disclosure includes one or more auxiliary layers disposed on the core, and a preferably immediately adjacent to the outer core surface. For example, for some applications, it may be preferred to deposit a barrier coating that limits transmission of moisture to the core. Such barrier coatings or layers are relatively thin. Generally, such coatings are at least 0.0001 inch, and preferably, at least 0.003 inch in thickness. Furthermore an adhesion promoting layer may be used between the cover layers and/or the core, or the cover and core having a barrier coating disposed thereon. Such adhesion promoting layers are known in the art and may be used in combination with the features described herein. See for example U.S. Pat. No. 5,820,488, which is hereby incorporated by reference.

The inner cover layer that is molded over the core is preferably about 0.0005 inch to about 0.15 inch in thickness. The inner ball that includes the core and inner cover layer(s), or core for a two piece ball, preferably has a diameter in the range of 1.25 to 1.67 inches. The outer cover layer is about 0.0005 inch to about 0.20 inch thick. Together, the core, the inner cover layer(s) and the outer cover layer (or core and single cover layer) combine to form a ball having a diameter of 1.680 inches or more, the minimum diameter permitted by the rules of the U.S.G.A. and weighing no more than 1.62 ounces. If desired, golf balls of different weights and diameters may also be formed if the rules of the U.S.G.A. are not an issue.

In a particular embodiment of the disclosure, the golf ball has a dimple pattern that provides dimple coverage of 65% or more, preferably 75% or more, and ore preferably about 80 to 85% or more In another embodiment, there are from 300 to less than 500 dimples, preferably from about 340 to about 440 dimples.

Specifically, the arrangement and total number of dimples are not critical and may be properly selected within ranges that are well known. For example, the dimple arrangement may be an octahedral, dodecahedral or icosahedral arrangement. The total number of dimples is generally from about 250 to about 600, and especially from about 300 to about 500. The golf balls of the present invention may comprise circular or non-circular dimples or any combination.

In a further embodiment, the golf ball typically is coated with a durable, abrasion-resistant, relatively non-yellowing finish coat or coats if necessary. The finish coat or coats may have some optical brightener and/or pigment added to improve the brightness of the finished golf ball.

In one embodiment, from 0.001 to about 10% optical brightener may be added to one or more of the finish coatings. If desired, optical brightener may also be added to the cover materials. One type of preferred finish coatings are solvent based urethane coatings known in the art. It is also contemplated to provide a transparent outer coating or layer on the final finished golf ball.

Golf balls also typically include logos and other markings printed onto the dimpled spherical surface of the ball. Paint, typically clear paint, is applied for the purposes of protecting the cover and improving the outer appearance before the ball is completed as a commercial product.

If the core in the component is the product of a reaction mixture of an isocyanate and a polyol wherein the stoichiometry between the reactants is imbalanced, the same processing conditions are used as are described above with respect to covers. One difference is, of course, that no retractor pins are needed in the mold. Furthermore, an undimpled, smaller mold is used. If, however, a one piece ball is desired, a dimpled mold would be used.

If the component is a golf ball core layer, it typically contains 0 to 20 weight percent of filler material, and in specific embodiments 1 to 15 weight percent based on the weight of the layer.

If the component is an inner cover layer or mantle layer, it typically contains 0 to 60 weight percent of filler material; in other embodiments it contains 1 to 30 weight percent or 1 to 20 weight percent filler material based on the weight of the layer.

If the component is an outer cover layer, it typically contains 0 to 20 weight percent of filler material in other embodiments it contains 1 to 10 weight percent or 1 to 5 weight percent filler material based on the weight of the layer.

Fillers are used to adjust the density, flex modulus, mold release, and/or melt flow index of a layer. With some fillers, up to about 200 parts by weight can be used. When the filler is for adjustment of density or flex modulus of a layer, it is present in an amount of at least 5 parts by weight based upon 100 parts by weight of the layer.

A density adjusting filler is used to control the moment of inertia, and thus the initial spin rate of the ball and spin decay. The addition in one or more layers, and particularly in the outer cover layer, of a filler with a lower specific gravity than the resin composition results in a decrease in moment of inertia and a higher initial spin rate than would result if no filler were used. The addition in one or more of the cover layers, and particularly in the outer cover layer, of a filler with a higher specific gravity than the resin composition, results in an increase in moment of inertia and a lower initial spin rate. High specific gravity fillers are preferred as less volume is used to achieve the desired inner or outer cover total weight. Nonreinforcing fillers are also preferred as they have minimal effect on COR. Preferably, the filler does not chemically react with the resin composition to a substantial degree, although some reaction may occur when, for example, zinc oxide is used in a shell layer which contains some ionomer. The filler usually has a specific gravity which is at least 0.05, and in specific embodiments at least 0.1, higher or lower than the specific gravity of the layer composition. In further embodiments, density adjusting fillers are used which have specific gravities which are higher or lower than the specific gravity of the resin composition by 0.2 or more or by 2.0 or more.

A flex modulus adjusting filler is a filler which, e.g. when used in an amount of 1 to 100 parts by weight based upon 100 parts by weight of resin composition, will raise or lower the flex modulus (ASTM.RTM. D-790) of the resin composition by at least 1% and preferably at least 5% as compared to the flex modulus of the resin composition without the inclusion of the flex modulus adjusting filler.

A mold release adjusting filler is a filler which allows for the easier removal of a part from a mold and eliminates or reduces the need for external release agents which otherwise could be applied to the mold. A mold release adjusting filler typically is used in an amount of up to about 2 weight percent based upon the total weight of the layer.

A melt flow index adjusting filler is a filler which increases or decreases the melt flow, or ease of processing, of the composition.

If the component is a layer, it may contain coupling agents that increase adhesion of materials within a particular layer, e.g. to couple a filler to a resin composition, or between adjacent layers. Non-limiting examples of coupling agents include titanates, zirconates and silanes. Coupling agents typically are used in amounts of 0.1 to 2 weight percent based upon the total weight of the composition in which the coupling agent is included.

Fillers which may be employed in layers other than the outer cover layer may be or are typically in a finely divided form, for example, in a size generally less than about 20 mesh, preferably less than about 100 mesh U.S. standard size, except for fibers and flock, which are generally elongated. Flock and fiber sizes should be small enough to facilitate processing. Filler particle size will depend upon desired effect, cost, ease of addition, and dusting considerations. The filler preferably is selected from the group consisting of precipitated hydrated silica, clay, talc, asbestos, glass fibers, aramid fibers, mica, calcium metasilicate, barium sulfate, zinc sulfide, lithopone, silicates, silicon carbide, diatomaceous earth, polyvinyl chloride, carbonates, metals, metal alloys, tungsten carbide, metal oxides, metal stearates, particulate carbonaceous materials, micro balloons, and combinations thereof.

Specific embodiments of the disclosure will now be described in detail. These examples are intended to be illustrative, and the disclosure is not limited to the materials, conditions, or process parameters set forth in these embodiments. All parts and percentages are by weight unless otherwise indicated.

EXAMPLES

Three types of golf balls were made on the same machine with the same mantles and cores. The stoichiometries of the golf ball covers were varied. The first comprised an 18.7% NCO prepolymer, unstabilized, at a stoichiometry of 95 and a ratio (NCO:OH) of 87:100 by weight and was designated as AdiRIM X021. The second comprised 16.58% NCO, at a stoichiometry of 95 and a ratio of 98.6:100 and was designated as VibraRIM (95 ST). The third comprised 16.58% NCO, at a stoichiometry of 80 and a ratio of 117.1:100 and was designated as VibraRIM (80 ST). The AdiRIM system served as an example of a means of increasing the hardness of a polymer through increasing the NCO content of the prepolymer. The higher NCO content of these prepolymers, at the same stoichiometry as the VibraRIM (95 ST) example, were meant to yield a harder polymer. This AdiRIM example and the VibraRIM (95 ST) example served as controls. Several dozen balls were made of each type and tested for physical properties, durability, Shore B hardness, scuff resistance, cut resistance, weatherability, and total spin rate.

TABLE 1 summarizes the constructions and test results for the examples of this disclosure. The physical properties of all three ball types are very similar. Durability, weatherability, and paint adhesion (wet barrel). Cut resistance and scuff resistance (both Paint Scuff and Material Scuff) were also comparable amongst the samples. The Shore B measurements, taken by hand on golf balls, indicated slightly harder covers on the AdiRIM component and the VibraRIM (80 ST) component. However, in the case of the VibraRIM (80 ST) sample, the spin rates on the drivers and the 5-iron were lower than either of the controls, while still maintaining favorable spin rates on the pitching wedge and chip shots. Taken together, these examples indicate that a golf ball component made at an imbalanced stoichiometry of 80, according to the present disclosure, shows comparable material toughness to those made with balanced stoichiometries and produced golf balls with slightly harder covers and thus, reduced spin rates.

TABLE ONE

| | Ball Description | 1<br>Unstabilized Higher NCO Prepolymer with Standard Polyol @ .021" and 95 stoich | 2<br>Standard Prepolymer with Standard Polyol @ .021" and 95 stoich | 3<br>Standard Prepolymer with Standard Polyol @ .021" and 80 stoich |
|---|---|---|---|---|
| Actual Core | Size (in) | 1.550 (0.0016) | 1.550 (0.0016) | 1.550 (0.0016) |
| | Weight (g) | 36.88 (0.12) | 36.88 (0.12) | 36.88 (0.12) |
| | Instron | 0.092 (0.0014) | 0.092 (0.0014) | 0.092 (0.0014) |
| | CoR | 0.800 (0.0024) | 0.800 (0.0024) | 0.800 (0.0024) |
| Actual Mantle | Size (in) | 1.639 (.0007) | 1.639 (.0007) | 1.639 (.0007) |
| | Weight (g) | 42.45 (0.06) | 42.45 (0.06) | 42.45 (0.06) |
| | Instron | .087 (.0014) | .087 (.0014) | .087 (.0014) |
| | CoR | .809 (.0014) | .809 (.0014) | .809 (.0014) |

TABLE ONE-continued

|  |  | 1<br>Unstabilized Higher NCO Prepolymer with Standard Polyol @ .021" and 95 stoich | 2<br>Standard Prepolymer with Standard Polyol @ .021" and 95 stoich | 3<br>Standard Prepolymer with Standard Polyol @ .021" and 80 stoich |
|---|---|---|---|---|
|  | Ball Description |  |  |  |
| Actual Ball | Pole Size(in) | 1.683 (.0010) | 1.683 (.0005) | 1.683 (.0006) |
|  | Equator Size (in) | 1.683 (.0008) | 1.683 (.0005) | 1.683 (.0011) |
|  | Weight (g) | 45.49 (.05) | 45.48 (.04) | 45.42 (.05) |
|  | Instron | .086 (.0016) | .087 (.0015) | .087 (.0017) |
|  | CoR | .805 (.0026) | .803 (.0012) | .805 (.0032) |
|  | NezFactor | 891 | 890 | 892 |
| Total Spin (MEAN VALUES) | USGA Driver (deg, fps, RPM) | 10.0, 260.0, 2603 | 10.1, 259.1, 2543 | 10.1, 259.5, 2406 |
|  | Pro Driver (deg, fps, RPM) | 9.6, 240.8, 3081 | 9.6, 240.4, 3118 | 9.6, 240.8, 3046 |
|  | Am. Driver (deg, fps, RPM) | 11.9, 201.8, 3463 | 11.9, 201.7, 3549 | 12.0, 202.0, 3400 |
|  | 5-Iron (deg, fps, RPM) | 14.0, 188.4, 6300 | 13.9, 188.3, 6439 | 14.2, 188.4, 6240 |
|  | P. Wedge (deg, fps, RPM) | 25.6, 138.7, 10212 | 25.6, 138.7, 10213 | 25.7, 138.7, 10115 |
|  | 76 fps Chip (deg, fps, RPM) | 28.8, 75.8, 7232 | 28.6, 76.1, 7375 | 28.8, 76.1, 7279 |
|  | 60 fps Chip (deg, fps, RPM) | 25.6, 61.0, 5973 | 25.4, 60.9, 6051 | 25.7, 60.9, 5914 |
| Physical Testing | Paint Scuff | 3.25 (paint only) | 3.45 (paint only) | 3.4 (paint only) |
|  | Material Scuff | 2.0 | 2.1 | 2.0 |
|  | Cut | 3 (mostly paint) | 4 (mostly paint) | 4 (mostly paint) |
|  | Shore B (Median values) | 89 | 88 | 89 |
|  | Wet Barrel | Pass | Pass | Pass |
|  | Weatherometer | Pass | Pass | Pass |
|  | Cold Crack (6 balls each to 5 blows) | No Failures | No Failures | No Failures |
|  | Barrel (18 balls each to 500 blows) | No Failures | No Failures | 1 @ 500 (1 cover failure also noted @ 500) |
|  | High Speed (18 balls each to 200 blows) | 1 each @ 138, 154, 171, 189, and 190 | 1 each @ 103, 113, 137, 2@ 152, 1@ 155, 1@198 | 1 each @ 97, 152, 153, and 194 |

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention:

1. A golf ball component including the product of a fast-chemical-reaction mixture comprising an isocyanate and a polyol, wherein the mixture has a stoichiometry of from about 50 to about 90 that is imbalanced, and wherein a nitrogen-carbon-oxygen group content of the mixture is greater than a hydroxyl content of the mixture.

2. The golf ball component of claim 1, wherein the mixture has a stoichiometry of from about 60 to about 90.

3. The golf ball component of claim 2, wherein the mixture has a stoichiometry of from about 70 to about 85.

4. The golf ball component of claim 1, wherein the golf ball component has a Shore B hardness of 50 or more.

5. The golf ball component of claim 4, wherein the golf ball component has a Shore B hardness of from about 80 to about 95.

6. The golf ball component of claim 1, wherein the component is selected from the group consisting of a one-piece golf ball, a cover, an intermediate layer, a layer of a cover, a core, and a layer of a core.

7. The golf ball component of claim 1, wherein the polyol comprises hydroxyl functional components and/or amino functional components.

8. The golf ball component of claim 7, wherein the polyol is a polyether polyol, a polyester polyol, or a polybutadiene.

9. The golf ball component of claim 1, wherein the component is formed from the fast-chemical-reaction mixture in a reaction time of two minutes or less.

10. The golf ball component of claim 9, wherein the component is formed from the fast-chemical-reaction mixture in a reaction time of one minute or less.

11. The golf ball component of claim 10, wherein the component is formed from the fast-chemical-reaction mixture in a reaction time of thirty seconds or less.

12. The golf ball component of claim 1, wherein the component has a flex modulus of 1000 psi or more.

13. A method for making a golf ball component, comprising:

forming a fast-chemical-reaction mixture comprising an isocyanate and a polyol, wherein the mixture has a stoichiometry of from about 50 to about 90 that is imbalanced and has a nitrogen-carbon-oxygen group content of the mixture is greater than a hydroxyl content of the mixture; and molding the reaction mixture to form a golf ball component.

14. The method of claim 13, wherein the mixture has a stoichiometry of from about 60 to about 90.

15. The method of claim 14, wherein the mixture has a stoichiometry of from about 70 to about 85.

16. The golf ball component produced by the method of claim 13.

17. The method of claim 13, wherein the component is selected from the group consisting of a one-piece golf ball, a cover, an intermediate layer, a layer of a cover, a core, and a layer of a core.

18. The method of claim 13, wherein the golf ball component has a Shore B hardness of 50 or more.

19. The method of claim 13, wherein the golf ball component has a Shore B hardness of from about 80 to about 95.

20. The method of claim 13, wherein the component is formed from the fast-chemical-reaction mixture in a reaction time of two minutes or less.

* * * * *